US010954816B2

(12) United States Patent
Kitamura et al.

(10) Patent No.: US 10,954,816 B2
(45) Date of Patent: Mar. 23, 2021

(54) TURBOCHARGER

(71) Applicant: MITSUBISHI HEAVY INDUSTRIES ENGINE & TURBOCHARGER, LTD., Sagamihara (JP)

(72) Inventors: Tsuyoshi Kitamura, Tokyo (JP); Seiichi Ibaraki, Tokyo (JP); Toyotaka Yoshida, Tokyo (JP); Hiroshi Suzuki, Sagamihara (JP); Motoki Ebisu, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 103 days.

(21) Appl. No.: 16/311,285

(22) PCT Filed: Sep. 28, 2017

(86) PCT No.: PCT/JP2017/035252
§ 371 (c)(1),
(2) Date: Dec. 19, 2018

(87) PCT Pub. No.: WO2018/110032
PCT Pub. Date: Jun. 21, 2018

(65) Prior Publication Data
US 2019/0234237 A1     Aug. 1, 2019

(30) Foreign Application Priority Data

Dec. 12, 2016 (JP) .............................. JP2016-240770

(51) Int. Cl.
*F01D 25/14*      (2006.01)
*F01D 25/24*      (2006.01)
*F02B 39/00*      (2006.01)

(52) U.S. Cl.
CPC .......... *F01D 25/145* (2013.01); *F01D 25/24* (2013.01); *F02B 39/00* (2013.01);
(Continued)

(58) Field of Classification Search
CPC ........ F01D 25/145; F01D 25/24; F01D 5/046; F02B 39/00; F02B 37/00; F05D 2240/70;
(Continued)

(56) References Cited

U.S. PATENT DOCUMENTS 3,928,963 A * 12/1975 Devers .................. F01D 21/045
                                                60/806
4,253,031 A *  2/1981 Frister ..................... F01D 15/10
                                                290/52
(Continued)

FOREIGN PATENT DOCUMENTS

DE    102013111562 A1    4/2015
EP        2302175 A1    3/2011
(Continued)

OTHER PUBLICATIONS

International Preliminary Report on Patentability and Written Opinion of the International Searching Authority, dated Jun. 27, 2019, for International Application No. PCT/JP2017/035252, with an English translation of the Written Opinion.
(Continued)

*Primary Examiner* — Ninh H. Nguyen
*Assistant Examiner* — Brian Christopher Delrue
(74) *Attorney, Agent, or Firm* — Birch, Stewart, Kolasch & Birch, LLP

(57) ABSTRACT

A turbocharge includes: a compressor wheel; a turbine wheel configured to rotate with the compressor wheel; a turbine housing disposed so as to cover the turbine wheel; a bearing supporting a rotational shaft of the turbine wheel rotatably; and a bearing housing accommodating the bear-
(Continued)

ing. One of the turbine housing or the bearing housing includes a fin portion protruding toward the other one of the turbine housing or the bearing housing so as to extend along an axial direction of the rotational shaft, and, between the turbine housing and the bearing housing, a cavity is formed on each side of the fin portion with respect to a radial direction of the rotational shaft.

10 Claims, 5 Drawing Sheets

(52) U.S. Cl.
CPC ...... *F05D 2220/40* (2013.01); *F05D 2240/70* (2013.01); *F05D 2260/231* (2013.01)

(58) Field of Classification Search
CPC ........... F05D 2260/231; F05D 2220/40; F05D 2300/5024; F05D 2240/14; F05D 2260/39; F05D 2240/15; F02C 6/12
See application file for complete search history.

(56) References Cited

U.S. PATENT DOCUMENTS

| | | | | |
|---|---|---|---|---|
| 5,465,482 | A * | 11/1995 | Elvekjaer | F01D 25/24 29/889.1 |
| 6,464,268 | B1 * | 10/2002 | Hough | F16L 23/08 285/367 |
| 7,134,836 | B2 * | 11/2006 | Scherrer | F01D 11/005 415/112 |
| 2004/0109755 | A1 * | 6/2004 | Meier | F01D 25/08 415/134 |
| 2008/0075582 | A1 * | 3/2008 | Sausse | F01D 17/165 415/159 |
| 2008/0304957 | A1 * | 12/2008 | Walter | F02C 6/12 415/159 |
| 2009/0060737 | A1 | 3/2009 | Frankenstein et al. | |
| 2009/0151348 | A1 * | 6/2009 | Hayashi | F01D 25/16 60/598 |
| 2010/0124489 | A1 * | 5/2010 | Suzuki | F01D 17/165 415/150 |
| 2011/0142604 | A1 * | 6/2011 | Schumnig | F01D 25/24 415/170.1 |
| 2011/0255955 | A1 * | 10/2011 | Holzschuh | F01D 11/003 415/111 |
| 2012/0263585 | A1 * | 10/2012 | Matsuyama | F16J 15/0887 415/204 |
| 2013/0170975 | A1 * | 7/2013 | Ishii | F01D 9/045 415/208.1 |
| 2013/0294947 | A1 * | 11/2013 | Schlienger | F01D 21/045 417/407 |
| 2013/0302185 | A1 * | 11/2013 | Gerard | F02C 7/28 417/407 |
| 2014/0140814 | A1 * | 5/2014 | Isono | F01D 17/165 415/58.5 |
| 2015/0125275 | A1 * | 5/2015 | Ueda | F01D 17/165 415/158 |
| 2015/0192026 | A1 * | 7/2015 | Gieg | F01D 11/12 277/598 |
| 2015/0252689 | A1 * | 9/2015 | Burmester | F01D 25/24 415/177 |
| 2016/0032768 | A1 * | 2/2016 | Schumnig | F01D 25/16 415/177 |
| 2016/0102678 | A1 * | 4/2016 | Crandall | F02B 39/14 415/177 |
| 2016/0326893 | A1 * | 11/2016 | Baldwin | F01D 25/145 |
| 2018/0003081 | A1 * | 1/2018 | Isayama | F16C 17/00 |
| 2018/0045211 | A1 * | 2/2018 | Okabe | F16J 15/14 |
| 2019/0078468 | A1 * | 3/2019 | Haas | F01D 11/025 |
| 2019/0234422 | A1 * | 8/2019 | Kitamura | F04D 29/4206 |

FOREIGN PATENT DOCUMENTS

| | | |
|---|---|---|
| EP | 2557215 A2 | 2/2013 |
| JP | 56-138421 A | 10/1981 |
| JP | 7-83067 A | 3/1995 |
| JP | 2003-227344 A | 8/2003 |
| JP | 2008-544134 A | 12/2008 |
| JP | 2009-529620 A | 8/2009 |
| JP | 4931917 B2 | 5/2012 |
| JP | 2015-25460 A | 2/2015 |
| WO | WO 2016/151747 A1 | 9/2016 |

OTHER PUBLICATIONS

International Search Report, dated Dec. 5, 2017, for International Application No. PCT/JP2017/035252, with an English translation.
Extended European Search Report, dated Nov. 21, 2019, for European Application No. 17880022.3.
Japanese Office Action, dated Jan. 14, 2020, for Japanese Application No. 2016-240770, along with an English translation.
Office Action dated May 27, 2020 issued in counterpart Chinese Application No. 201780043216.8 with a Machine Translation.

* cited by examiner

TURBOCHARGER

TECHNICAL FIELD

The present disclosure relates to a turbocharger.

BACKGROUND ART

A turbocharger includes a turbocharger body, a compressor, and a turbine. The turbocharger body includes a rotational shaft and a bearing housing which supports the rotational shaft rotatably via a bearing. The rotational shaft includes a turbine wheel disposed on the side of the first end portion, and a compressor wheel disposed on the side of the second end portion. The turbine wheel is accommodated in a turbine wheel connected to the bearing housing. The compressor wheel is accommodated in a compressor housing connected to the bearing housing.

Such a turbocharger rotates the turbine wheel with an exhaust gas flow supplied from an engine into a turbine housing. In accordance with rotation of the turbine wheel, the compressor wheel disposed inside the compressor housing rotates, and compresses air. The air compressed by the compressor is supplied to an engine.

Patent Document 1 discloses a configuration where a heat insulator and a gap that functions as a heat-insulating layer are disposed between the turbine wheel and the bearing housing, to suppress heat transfer from the turbine to the bearing housing.

CITATION LIST

Patent Literature

Patent Document 1: JP4931917B

SUMMARY

Problems to be Solved

In the above turbocharger, it is desirable to suppress the heat transfer from the turbine to the bearing housing further.

In view of the above, at least some embodiments of the present invention is to provide a turbocharger whereby it is possible to suppress the heat transfer from the turbine to the bearing housing further.

Solution to the Problems (1) According to at least some embodiments of the present invention, a turbocharger includes: a compressor wheel; a turbine wheel configured to rotate with the compressor wheel; a turbine housing disposed so as to cover the turbine wheel; a bearing supporting a rotational shaft of the turbine wheel rotatably; and a bearing housing accommodating the bearing. One of the turbine housing or the bearing housing includes a fin portion protruding toward the other one of the turbine housing or the bearing housing so as to extend along an axial direction of the rotational shaft. A cavity is formed between the turbine housing and the bearing housing, on each side of the fin portion with respect to a radial direction of the rotational shaft.

With the above configuration (1), the fin portion is provided so as to extend along the axial direction of the rotational shaft from one of the turbine housing or the bearing housing toward the other one of the turbine housing or the bearing housing, and the cavities are formed on both sides of the fin portion. Accordingly, it is possible to suppress heat transfer from the turbine housing to the bearing housing, and reduce loss of thermal energy of the turbocharger. Further, the fin portion and the cavities on both sides thereof generate a labyrinth effect, which makes it possible to improve the sealing performance between the turbine housing and the bearing housing.

(2) In some embodiments, in the above configuration (1), the fin portion includes a tip being in contact with the other one of the turbine housing or the bearing housing.

With the above configuration (2), the tip of the fin portion is in contact with the turbine housing or the bearing housing, and thus the sealing effect generated by the fin portion is improved.

(3) In some embodiments, in the above configuration (1) or (2), the turbocharger further includes a fastening portion configured to fasten the turbine housing and the bearing housing. The fastening portion is configured to apply a fastening force in the axial direction to the turbine housing and the bearing housing so that a tip of the fin portion makes contact with the other one of the turbine housing or the bearing housing.

With the above configuration (3), while the turbine housing and the bearing housing are fastened, the tip of the fin portion is in contact with the turbine housing or the bearing housing, and thereby it is possible to determine the position of the turbine housing with respect to the bearing housing in the axial direction.

(4) In some embodiments, in any one of the above configurations (1) to (3), the other one of the turbine housing or the bearing housing includes a groove which receives a tip of the fin portion.

With the above configuration (4), a groove that receives the tip of the fin portion is formed on the turbine housing or the bearing housing, and thus it is possible to enhance the labyrinth effect generated by the fin portion and the cavities, and improve the sealing effect generated by the fin portion.

(5) In some embodiments, in the above configuration (4), the tip of the fin portion is in contact with a bottom surface of the groove.

With the above configuration (5), the tip of the fin portion is in contact with the bottom surface of the groove, and thus it is possible to improve the sealing performance of the fin portion even further.

(6) In some embodiments, in the above configuration (4) or (5), the turbocharger further includes a heat insulator disposed inside the groove.

With the above configuration (6), the heat insulator is disposed in the groove that receives the tip of the fin portion, and thereby it is possible to suppress heat transfer to the bearing housing from the turbine housing effectively.

(7) In some embodiments, in any one of the above configurations (4) to (6), the turbocharger further includes a filling material disposed inside the groove.

With the above configuration (7), with the filling material being disposed in the groove that receives the tip of the fin portion, it is possible to prevent leakage of exhaust gas via the gap between the fin portion and the groove with the filling material, and to improve the sealing performance further.

(8) In some embodiments, in any one of the above configurations (1) to (7), the turbocharger further includes a back plate disposed on a back-surface side of the turbine wheel. The back plate includes a first end and a second end with respect to the radial direction, and the back plate is held between the turbine housing and the bearing housing so that the first end is in contact with the turbine housing and the second end is in contact with the other one of the bearing housing.

With the above configuration (8), with the back plate being disposed on the back-surface side of the turbine wheel, it is possible to suppress heat transfer from the turbine housing to the bearing housing even further, through the heat shield effect generated by the back plate.

Furthermore, with both of the end portions of the back plate being in contact with the turbine housing and the bearing housing respectively to hold the back plate, it is possible to reduce the amount of heat transmitted to the bearing housing from the turbine housing via the back plate, compared to a case where the turbine housing and the bearing housing nip the back plate.

(9) In some embodiments, in the above configuration (8), the turbine housing includes a first stepped portion for locking the first end of the back plate, and the bearing housing includes a second stepped portion for locking the second end of the back plate.

With the above configuration (9), with both of the end portions of the back plate respectively being locked by the first stepped portion of the turbine housing and the second stepped portion of the bearing housing, it is possible to hold the back plate appropriately while suppressing heat transfer from the turbine housing to the bearing housing via the back plate.

(10) In some embodiments, in the above configuration (8) or (9), the back plate extends obliquely with respect to the radial direction from the first end toward the second end of the back plate, in a cross section along the axial direction.

With the above configuration (10), even in a case where both of the end portions of the back plate are in contact with the turbine housing and the bearing housing respectively and thereby the back plate is held (where the back plate is not nipped between the turbine housing and the bearing housing), it is possible hold the back plate reliably.

(11) In some embodiments, in the above configuration (8) or (9), the back plate includes: a first annular portion including the first end and extending in the axial direction along a wall surface of the turbine housing; a second annular portion including the second end and extending in the axial direction along a wall surface of the bearing housing; and a middle flange portion disposed between the first annular portion and the second annular portion so as to connect the first annular portion and the second annular portion.

With the above configuration (11), even in a case both of the end portions of the back plate are in contact with the turbine housing and the bearing housing respectively and thereby the back plate is held (where the back plate is not nipped between the turbine housing and the bearing housing), it is possible hold the back plate reliably.

(12) In some embodiments, in any one of the above configurations (1) to (11), the fin portion is an annular fin disposed around the rotational shaft.

With the above configuration (12), the fin portion is an annular fin and thus the fin portion is continuous in the circumferential direction. Accordingly, it is possible to effectively suppress a leakage flow passing through the tip gap of the fin portion in the radial direction.

Advantageous Effects

According to some embodiments of the present invention, it is possible to suppress heat transfer from the turbine housing to the bearing housing, and reduce loss of thermal energy of the turbocharger.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
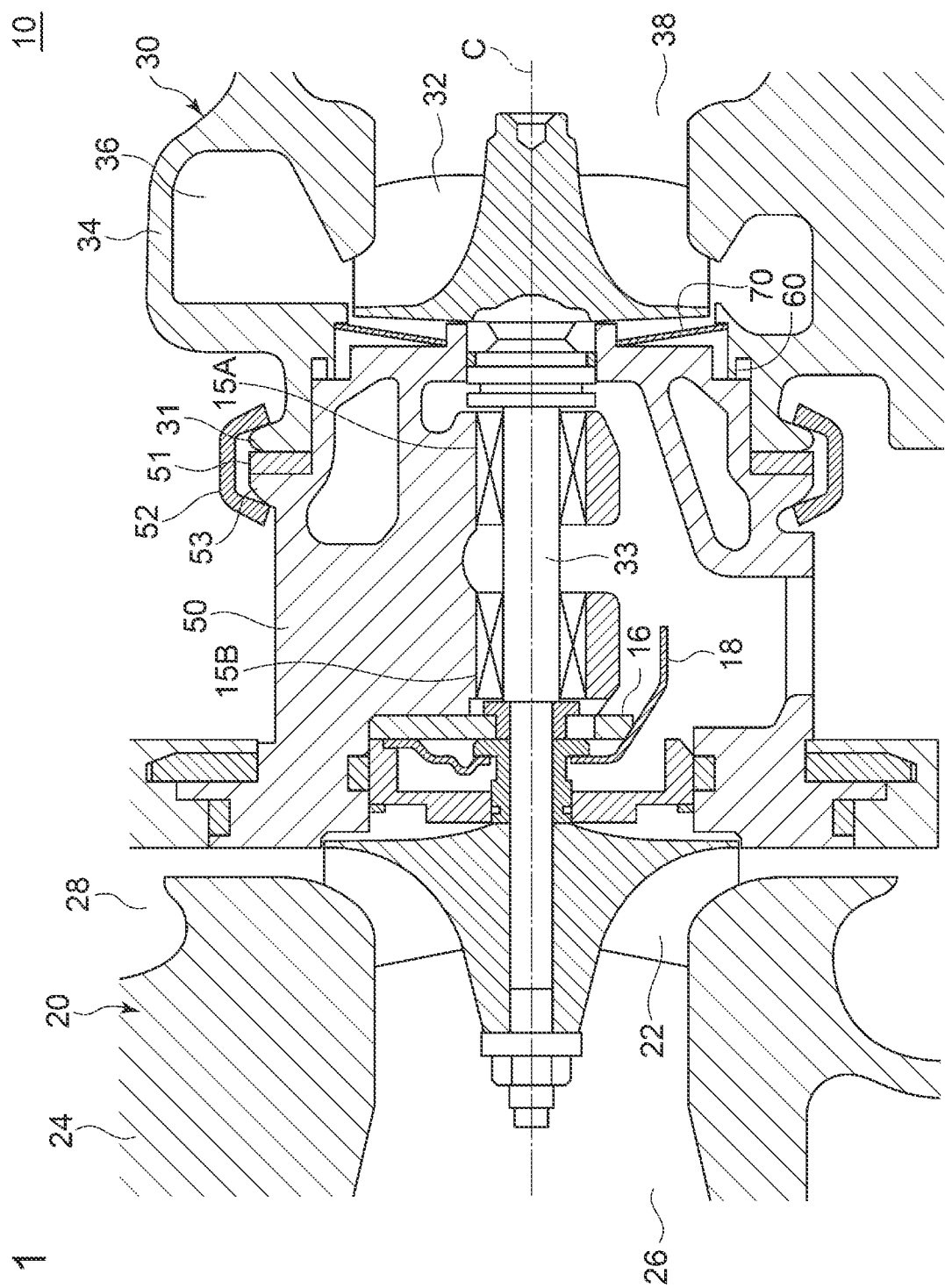
FIG. 1 is a cross-sectional view illustrating an overall configuration of a turbocharger according to an embodiment.

FIG. 1 is a cross-sectional view illustrating an overall configuration of a turbocharger according to an embodiment.

As shown in the drawing, the turbocharger 10 includes a compressor 20 for pressurizing intake air to an internal combustion engine (not depicted), and a turbine 30 driven by exhaust gas of the internal combustion engine.

The compressor 20 includes a compressor wheel 22, and a compressor housing 24 disposed so as to cover the compressor wheel 22. Intake air having entered from an inlet portion 26 of the compressor 20 is compressed by the compressor wheel 22, flows out from an outlet portion 28 of the compressor 20, and is guided to the internal combustion engine.

Furthermore, the turbine 30 includes a turbine wheel 32, and a turbine housing 34 disposed so as to cover the turbine wheel 32. The turbine wheel 32 is coupled to the compressor wheel 22 via a rotational shaft 33. Accordingly, the turbine wheel 32 rotates with the compressor wheel 22. Exhaust gas having entered from an inlet portion (scroll portion) 36 of the turbine 30 performs work for the turbine wheel 32, and then is discharged from an outlet portion 38 of the turbine 30.

Further, on the back-surface side of the turbine wheel 32, a back plate 70 described below is provided.

A bearing housing 50 is disposed between the compressor housing 24 and the turbine housing 34. The bearing housing 50 includes radial bearings 15A, 15B and a thrust bearing 16. The rotational shaft 33 of the turbine wheel 32 is supported rotatably by the radial bearings (15A, 15B). Further, an oil deflector 18 is disposed on the side closer to the compressor 20 than the thrust bearing 16, so as to block inflow of lubricant oil supplied to the radial bearings 15A, 15B and the thrust bearing 16 toward the compressor 20.

The turbine housing 34 and the bearing housing 50 are fastened by a fastening member 52. At this time, the position of the turbine housing 34 may be determined with respect to the bearing housing 50, with a fin portion 60 disposed on one of the turbine housing 34 or the bearing housing 50 being in contact with the other one of the housings (50, 34). The fin portion 60 will be described later.

In an illustrative embodiment depicted in FIG. 1, a flange 31 of the turbine housing 34 and a flange 53 of the bearing housing 50 are fastened by a clamp 52. In another embodiment, the flange 31 of the turbine housing 34 and the flange 53 of the bearing housing 50 are fastened by using a fastening bolt, instead of the clamp 52. Further, to suppress heat transfer via the fastening portion between the housings (34, 50), a heat insulator 51 may be provided between the flange 31 of the turbine housing 34 and the flange 53 of the bearing housing 50.

Figure 2A:
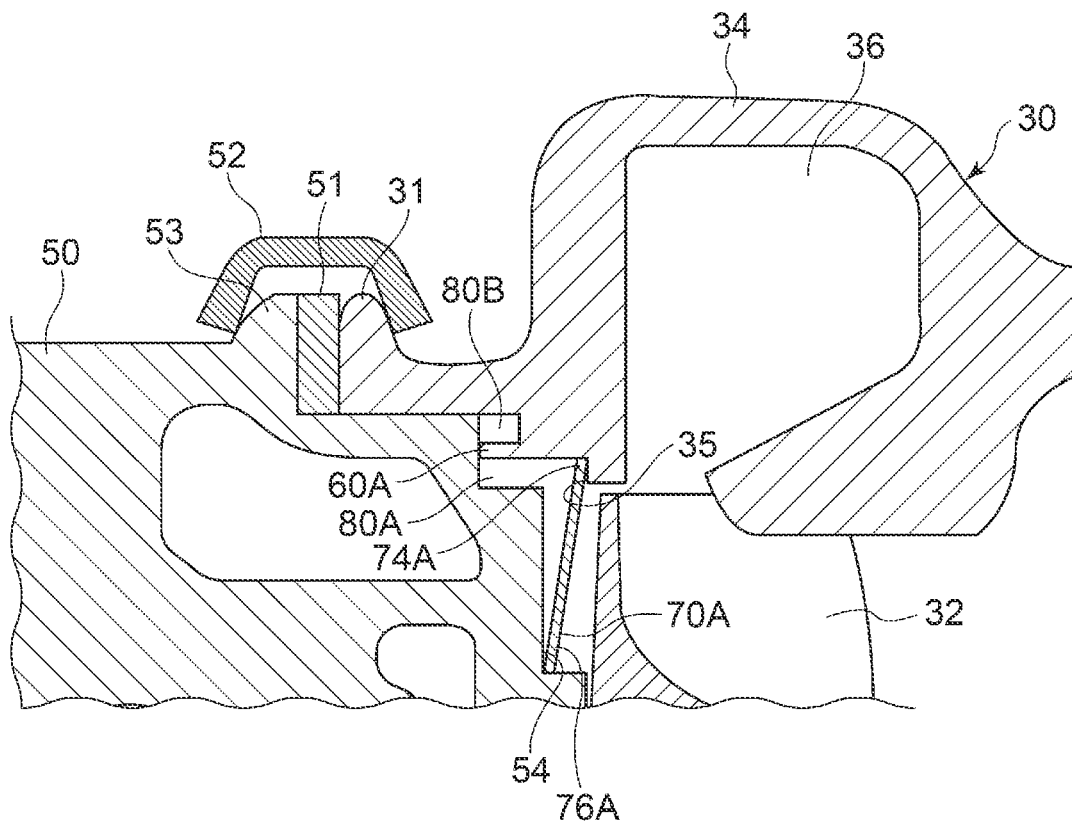
FIG. 2A is a cross-sectional view illustrating a structure around a fastening portion between the turbine housing and the bearing housing according to an embodiment.
Figure 2B:
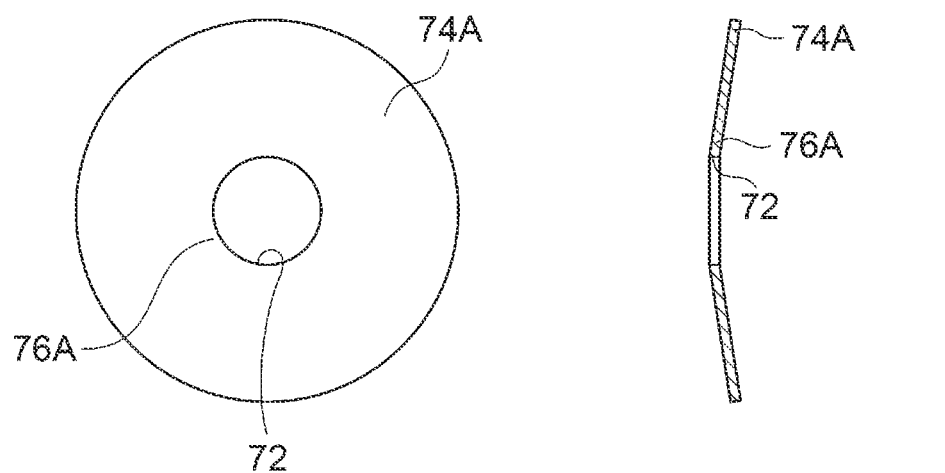
FIG. 2B is a diagram illustrating a configuration of the back plate in FIG. 2A.
Figure 3:
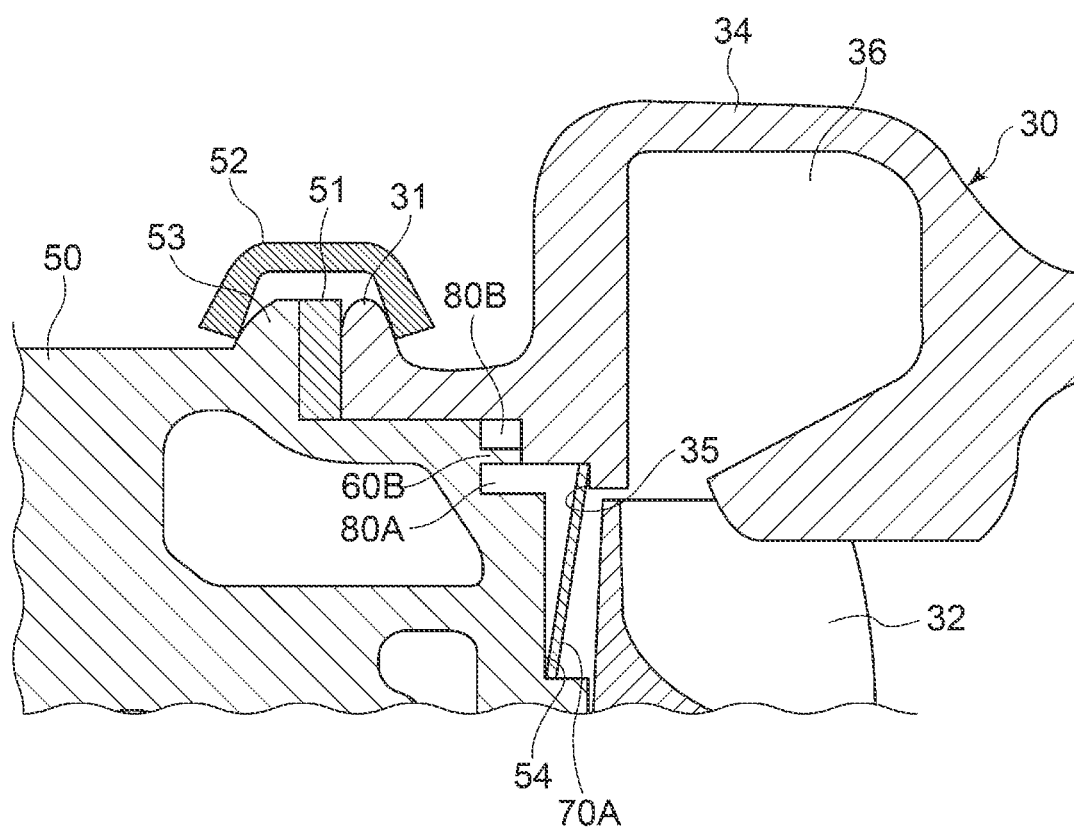
FIG. 3 is a cross-sectional view illustrating a structure around a fastening portion between a turbine housing and a bearing housing according to an embodiment.
Figure 4A:
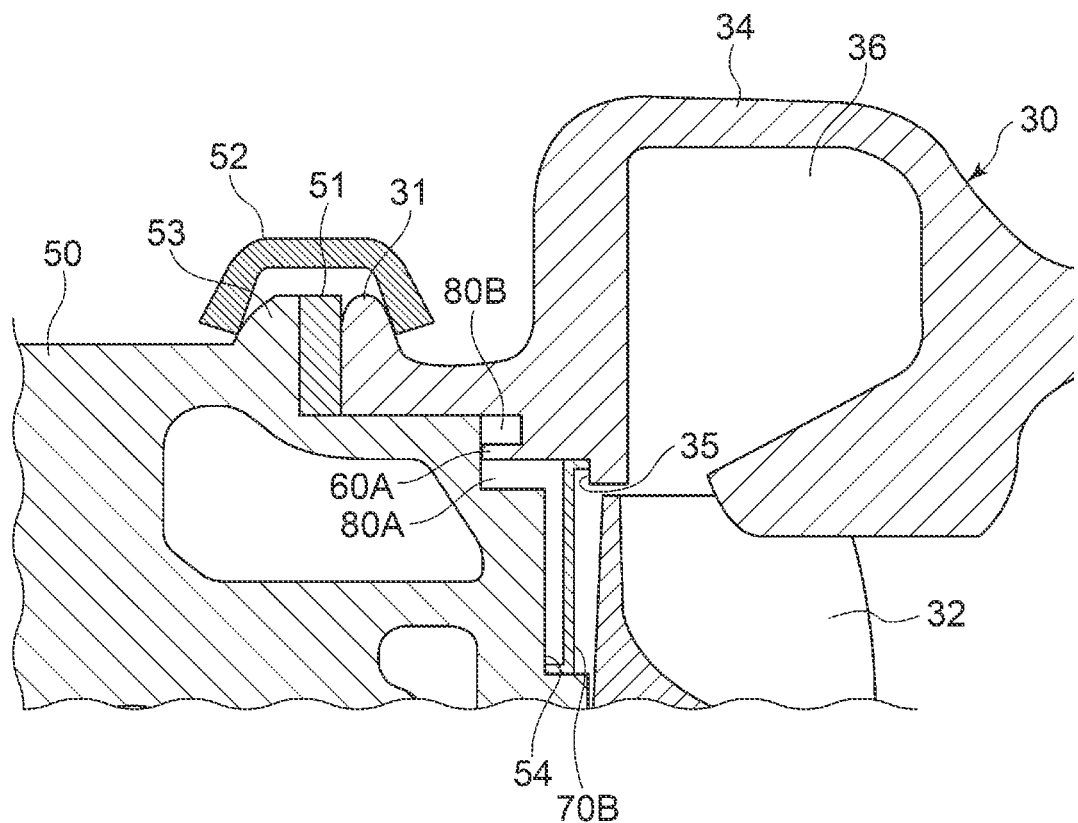
FIG. 4A is a cross-sectional view illustrating a structure around a fastening portion between the turbine housing and the bearing housing according to an embodiment.
Figure 4B:
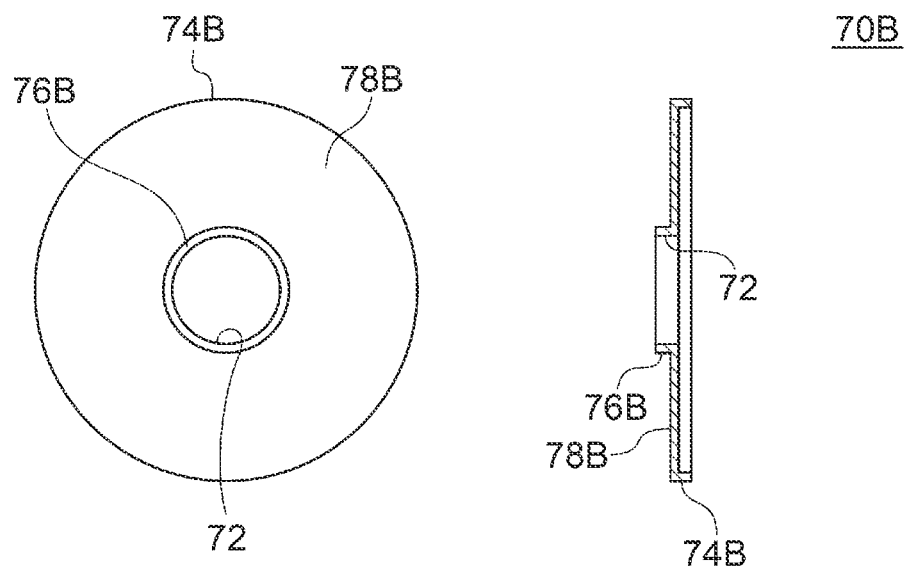
FIG. 4B is a diagram illustrating a configuration of the back plate in FIG. 4A.

FIG. 2A is a cross-sectional view illustrating a structure around a fastening portion between the turbine housing and the bearing housing according to an embodiment. FIG. 2B is a diagram illustrating a configuration of the back plate 70A in FIG. 2A. FIG. 3 is a cross-sectional view illustrating a structure around a fastening portion between a turbine housing and a bearing housing according to an embodiment. FIG. 4A is a cross-sectional view illustrating a structure around a fastening portion between the turbine housing and the bearing housing according to an embodiment. FIG. 4B is a diagram illustrating a configuration of the back plate 70B in FIG. 4A.

In some embodiments, as shown in FIGS. 2 to 4, one of the turbine housing 34 or the bearing housing 50 includes a fin portion 60 (60A, 60B) extending along the axial direction of the rotational shaft 33. The fin portion 60 (60A, 60B) protrudes toward the other one of the turbine housing 34 or the bearing housing 50. The tip of the fin portion 60 (60A, 60B) is in contact with the other one of the turbine housing 34 or the bearing housing 50.

In an embodiment, the fin portion 60 (60A, 60B) is an annular fin disposed around the rotational shaft 33.

In this case, the fin portion 60 is continuous in the circumferential direction, and it is possible to effectively suppress a leakage flow passing through the tip gap of the fin portion 60 in the radial direction.

Further, a pair of cavities 80A, 80B are formed on both sides of the fin portion 60 (60A, 60B) having the above configuration, with respect to the radial direction. The cavity 80A is formed on the inner side of the fin portion 60 with respect to the radial direction, between the turbine housing 34 and the bearing housing 50. Furthermore, the cavity 80B is formed on the outer side of the fin portion 60 with respect to the radial direction, between the turbine housing 34 and the bearing housing 50. That is, the pair of cavities 80A, 80B are formed on both sides across the fin portion 60 (60A, 60B) with respect to the radial direction of the rotational shaft 33.

In an illustrative embodiment shown in FIGS. 2 to 4, the fin portion 60 (60A, 60B) has a constant thickness. Nevertheless, the fin portion may have a thickness that decreases toward the tip in the radial direction.

Accordingly, by forming the cavities 80A, 80B on both sides of the fin portion 60 (60A, 60B), it is possible to suppress heat transfer from the turbine housing 34 to the bearing housing 50, and reduce loss of thermal energy of the turbocharger 10.

Further, the fin portion 60 (60A, 60B) and the cavities 80A, 80B on both sides thereof generate a labyrinth effect, which makes it possible to improve the sealing performance between the turbine housing 34 and the bearing housing 50. In particular, in a case where the tip of the fin portion 60 (60A, 60B) is in contact with the turbine housing 34 or the bearing housing 50 as described above, it is possible to achieve a high sealing effect generated by the fin portion 60.

Further, in an illustrative embodiment shown in FIGS. 2A and 4A, a fin portion 60A is disposed on the turbine housing 34 so as to protrude toward the bearing housing 50 in the axial direction. In contrast, in an illustrative embodiment shown in FIG. 3, a fin portion 60B is disposed on the bearing housing 50 so as to protrude toward the turbine housing 34 in the axial direction.

In some embodiments, as shown in FIGS. 2 to 4, the back plate 70 (70A, 70B) is disposed on the back surface side of the turbine wheel 32. The first end of the back plate 70 is in contact with the turbine housing 34. The second end of the back plate 70 is in contact with the bearing housing 50. Accordingly, the back plate 70 is held between the turbine housing 34 and the bearing housing 50.

Accordingly, with the back plate 70 being disposed on the back-surface side of the turbine wheel 32, it is possible to suppress heat transfer from the turbine housing 34 to the bearing housing 50 even further, through the heat shield effect generated by the back plate 70. Furthermore, with both of the end portions of the back plate 70 being in contact with the turbine housing 34 and the bearing housing 50 respectively to hold the back plate 70, it is possible to reduce the amount of heat transmitted to the bearing housing 50 from the turbine housing 34 via the back plate 70, compared to a case where the turbine housing and the bearing housing nip the back plate.

In the embodiment shown in FIGS. 2 to 4, the turbine housing 34 includes a first stepped portion 35 for locking the first end of the back plate 70 (70A, 70B). Furthermore, the bearing housing 50 includes a second stepped portion 54 for locking the second end of the back plate 70 (70A, 70B).

Accordingly, with both of the end portions of the back plate 70 being locked by the first stepped portion 35 of the turbine housing 34 and the second stepped portion 54 of the bearing housing 50, it is possible to hold the back plate 70 appropriately while suppressing heat transfer from the turbine housing 34 to the bearing housing 50 via the back plate 70.

As shown in FIG. 2B, in an embodiment, the back plate 70A has an opening 72 into which a cylindrical portion disposed on the bearing housing 50 is to be fitted. On the radially outer side of the opening 72, the back plate 70A is disposed continuously in the circumferential direction. In a cross-section taken along the axial direction of the rotational shaft 33, the back plate 70A extends obliquely with respect to the radial direction so as to become farther away from the turbine wheel 32 in the axial direction, from the first end of the back plate 70A on the side of the turbine housing 34 (radially outer portion 74A) toward the second end of the back plate 70A on the side of the bearing housing 50 (radially inner portion 76A), and the back plate 70A has a truncated cone shape as a whole.

As shown in FIG. 2A and FIG. 3, in the back plate 70A having the above configuration, the radially outer portion 74A is in contact with the first stepped portion 35 of the turbine housing 34, and the radially inner portion 76A is in contact with the second stepped portion 54 of the bearing housing 50. Accordingly, the back plate 70A having a truncated cone shape is held between the turbine housing 34 and the bearing housing 50.

In another embodiment, as shown in FIG. 4B, the back plate 70B has an opening 72 into which a cylindrical portion disposed on the bearing housing 50 is to be fitted. On the radially outer side of the opening 72, the back plate 70B is disposed continuously in the circumferential direction. The back plate 70B includes a first annular portion 74B positioned on the radially outer side, a second annular portion 76B having the opening 72 and being positioned on the radially inner side, and a middle flange portion 78B connecting the first annular portion 74B and the second annular portion 76B. In other words, the back plate 70B has a disc portion formed by the middle flange portion 78B, and has annular protruding portions 74B, 76B protruding opposite to each other, disposed on the radially outer portion and the radially inner portion of the disc portion.

As shown in FIG. 4A, the back plate 70B having the above configuration is held between the turbine housing 34 and the bearing housing 50. In this state, the first annular portion 74B of the back plate 70B extends in the axial direction along the wall surface of the turbine housing 34, and is in contact with the first stepped portion 35 of the turbine housing 34. Furthermore, the second annular portion 76B extends in the axial direction along the wall surface of the bearing housing 50, and is in contact with the second stepped portion 54 of the bearing housing 50.

In the embodiments shown in FIGS. 2 to 4, the wall surface of the housing (34, 50) facing the tip of the fin portion 60 (60A, 60B) is a flat surface. However, in some other embodiments, a groove is formed on the housing (34, 50) facing the tip of the fin portion 60 (60A, 60B).

Figure 5A:
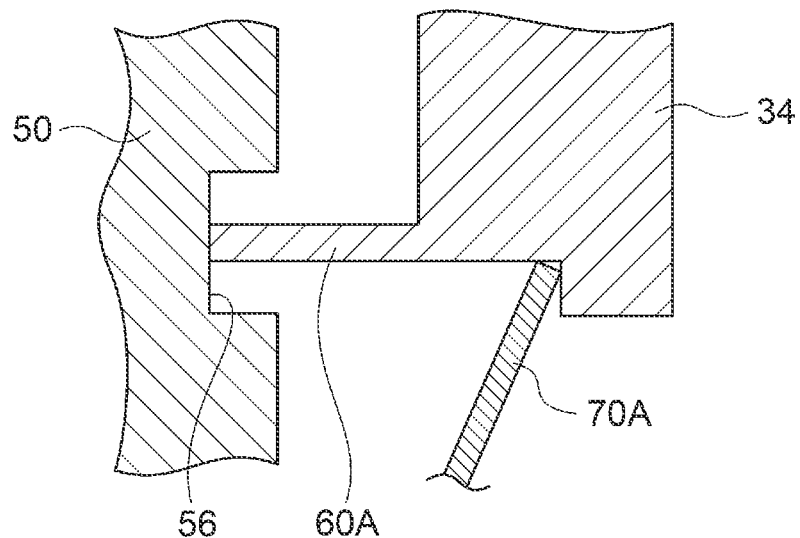
FIGS. 5A and 5B are each a cross-sectional view illustrating a configuration of a housing having a groove which receives a tip of a fin portion according to an embodiment.
Figure 5B:
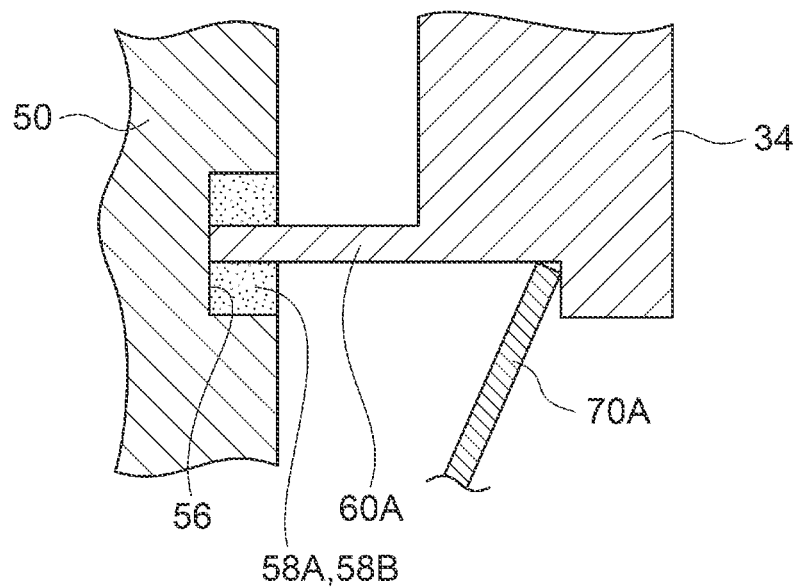

FIGS. 5A and 5B are each a cross-sectional view illustrating a configuration of a housing having a groove which receives a tip of a fin portion according to an embodiment.

As shown in FIGS. 5A and 5B, on the wall surface facing the fin portion 60A of the bearing housing 50, a groove 56 which receives the tip of the fin portion 60A is formed. The tip of the fin portion 60A is in contact with the bottom surface of the groove 56, so as to improve the sealing performance of the fin portion 60A.

In the illustrative embodiment shown in FIG. 5B, a heat insulator 58A or a filling material 58B is disposed in the groove 56 of the bearing housing 50.

In a case where the heat insulator 58A is disposed in the groove 56, it is possible to suppress heat transfer to the bearing housing 50 from the turbine housing 34 effectively. As the heat insulator 58A, a heat insulator (heat shield) having a thermal conductivity of not higher than 0.1 W/m/K at normal temperature may be used, and for instance, the heat insulator 58A may be formed from a porous body made of a ceramic-based material or a silica-based material.

In a case where the filling material 58B is disposed in the groove 56, it is possible to prevent leakage of exhaust gas via the gap between the fin portion 60A and the groove 56 with the filling material 58B, and to improve the sealing performance.

Further, a single member may serve as both of the heat insulator 58A and the filling material 58B.

Further, in the embodiment shown in FIGS. 5A and 5B, the fin portion 60A is disposed on the turbine housing 34 and the groove 56 is disposed on the bearing housing 50. Nevertheless, this example is not limitative. That is, the fin portion 60B may be disposed on the bearing housing 50, and a groove that receives the tip of the fin portion 60B may be disposed on the turbine housing 34. In this case, the heat insulator 58A or the filling material 58B may be disposed in the groove of the turbine housing 34.

As described above, according to some embodiments of the present invention, the fin portion 60 (60A, 60B) is provided so as to extend along the axial direction of the rotational shaft 33 from one of the turbine housing 34 or the bearing housing 50 toward the other one of the turbine housing 34 or the bearing housing 50, with the cavities 80A, 80B formed on both sides of the fin portion 60, and thereby it is possible to suppress heat transfer from the turbine housing 34 to the bearing housing 50, and reduce loss of thermal energy of the turbocharger 10. Further, the fin portion 60 and the cavities 80A, 80B on both sides thereof generate a labyrinth effect, which makes it possible to improve the sealing performance between the turbine housing 34 and the bearing housing 50.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

10 Turbocharger
15A Radial bearing
16 Thrust bearing
18 Oil deflector
20 Compressor
22 Compressor wheel
24 Compressor housing
26 Inlet portion
30 Turbine
31 Flange
32 Turbine wheel
33 Rotational shaft
34 Turbine housing
35 First stepped portion
50 Bearing housing
51 Heat insulator
52 Fastening member
54 Second stepped portion
56 Groove
58A Heat insulator
58B Filling material
60, 60A, 60B Fin portion
70, 70A, 70B Back plate
72 Opening
74A Radially outer portion
76A Radially inner portion
76B First annular portion
74B Second annular portion
78B Middle flange portion
80A, 80B Cavity

The invention claimed is:

1. A turbocharger, comprising:
   a compressor wheel;
   a turbine wheel configured to rotate with the compressor wheel;
   a turbine housing disposed so as to cover the turbine wheel;
   a bearing supporting a rotational shaft of the turbine wheel rotatably; and
   a bearing housing accommodating the bearing,
   wherein one of the turbine housing and the bearing housing includes a fin portion protruding toward the other one of the turbine housing and the bearing housing so as to extend along an axial direction of the rotational shaft, and
   wherein, between the turbine housing and the bearing housing, a cavity is formed on each side of the fin portion with respect to a radial direction of the rotational shaft,
   wherein the turbocharger further comprises a fastener member configured to fasten the turbine housing and the bearing housing,
   wherein the fastener member is configured to apply a fastening force in the axial direction to the turbine housing and the bearing housing so that a tip of the fin portion makes contact with the other one of the turbine housing or the bearing housing,
   wherein the turbocharger further includes a back plate disposed on a back-surface side of the turbine wheel, and
   wherein the back plate includes a first end and a second end with respect to the radial direction, and the back plate is held between the turbine housing and the bearing housing so that the first end is in contact with the turbine housing and the second end is in contact with the bearing housing,
   the back plate extends from the first end to the second end so as to at least partially face a back surface of the turbine wheel.

2. The turbocharger according to claim 1,
   wherein the bearing housing has an axial end face spaced from the back surface of the turbine wheel via an axial gap between the bearing housing and the back surface, and
   wherein the back plate includes an inner portion disposed in the axial gap.

3. The turbocharger according to claim 1,
   wherein the other one of the turbine housing and the bearing housing includes a groove which receives a tip of the fin portion.

4. The turbocharger according to claim 3,
   wherein the tip of the fin portion is in contact with a bottom surface of the groove.

5. The turbocharger according to claim 3, further comprising:
   a heat insulator disposed inside the groove.

6. The turbocharger according to claim 3, further comprising:
   a sealant disposed inside the groove.

7. The turbocharger according to claim 1,
   wherein the turbine housing includes a first stepped portion for locking the first end of the back plate, and
   wherein the bearing housing includes a second stepped portion for locking the second end of the back plate.

8. The turbocharger according to claim 1,
   wherein the back plate extends obliquely with respect to the radial direction from the first end toward the second end of the back plate, in a cross section along the axial direction.

9. The turbocharger according to claim 1,
   wherein the back plate includes:
      a first annular portion including the first end and extending in the axial direction along a wall surface of the turbine housing;
      a second annular portion including the second end and extending in the axial direction along a wall surface of the bearing housing; and
      a middle flange portion disposed between the first annular portion and the second annular portion so as to connect the first annular portion and the second annular portion.

10. The turbocharger according to claim 1,
    wherein the fin portion is an annular fin disposed around the rotational shaft.

* * * * *